June 27, 1933.  H. SOMERVELL  1,916,079
TRUCK
Filed Aug. 28, 1931  2 Sheets-Sheet 1
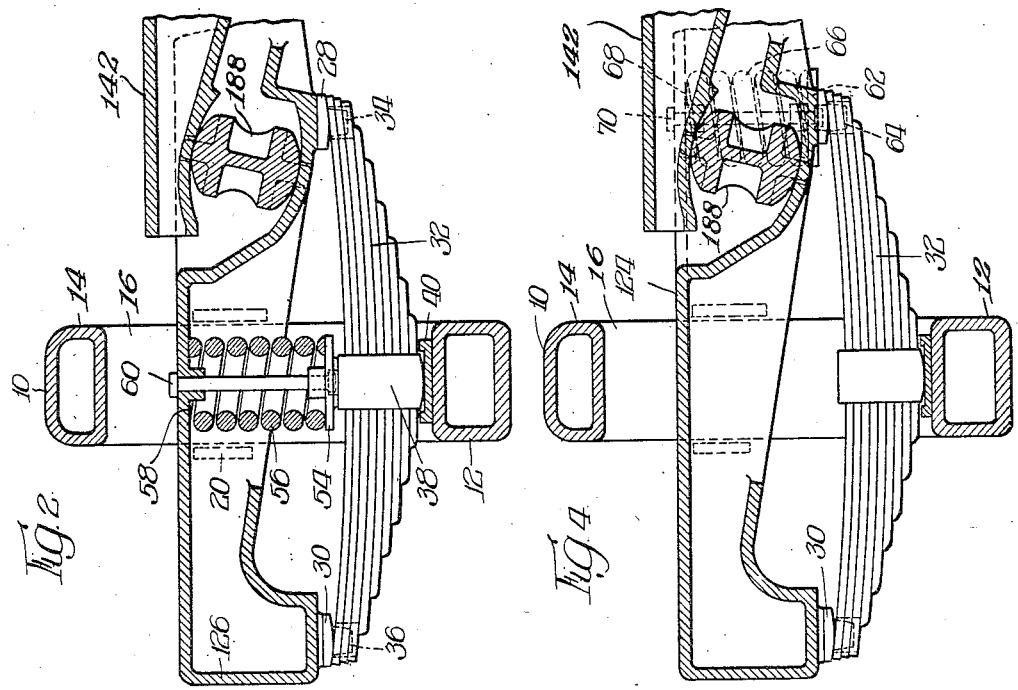
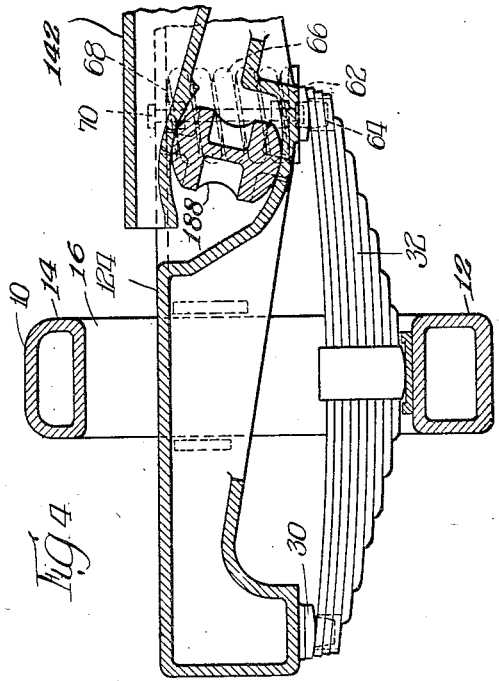
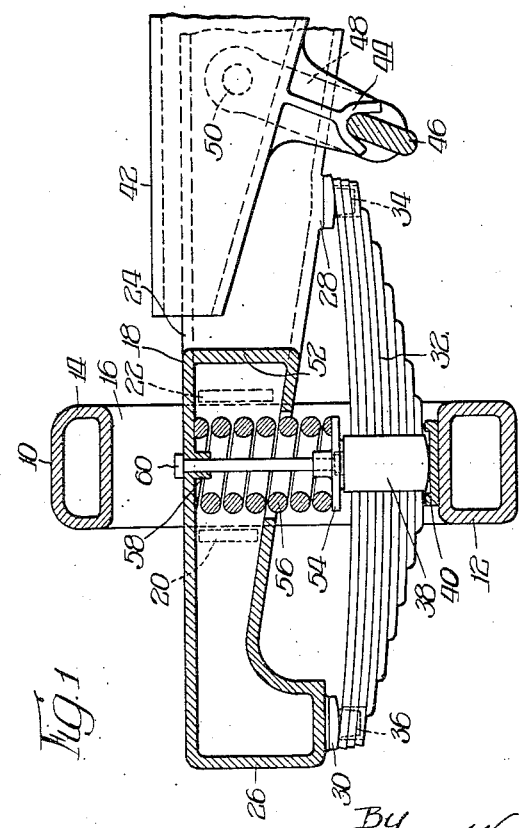
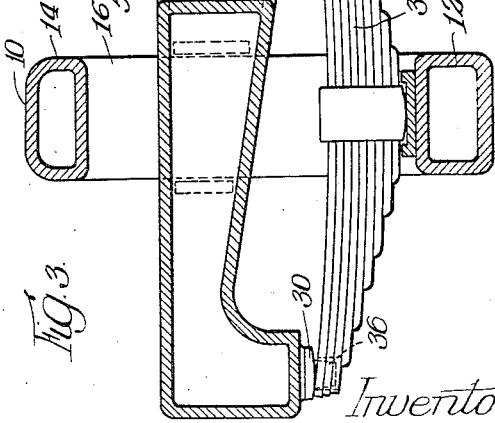
Inventor:
Howard Somervell.
By Wilkinson, Huxley, Byron + Knight
attys June 27, 1933. H. SOMERVELL 1,916,079
TRUCK
Filed Aug. 28, 1931 2 Sheets-Sheet 2
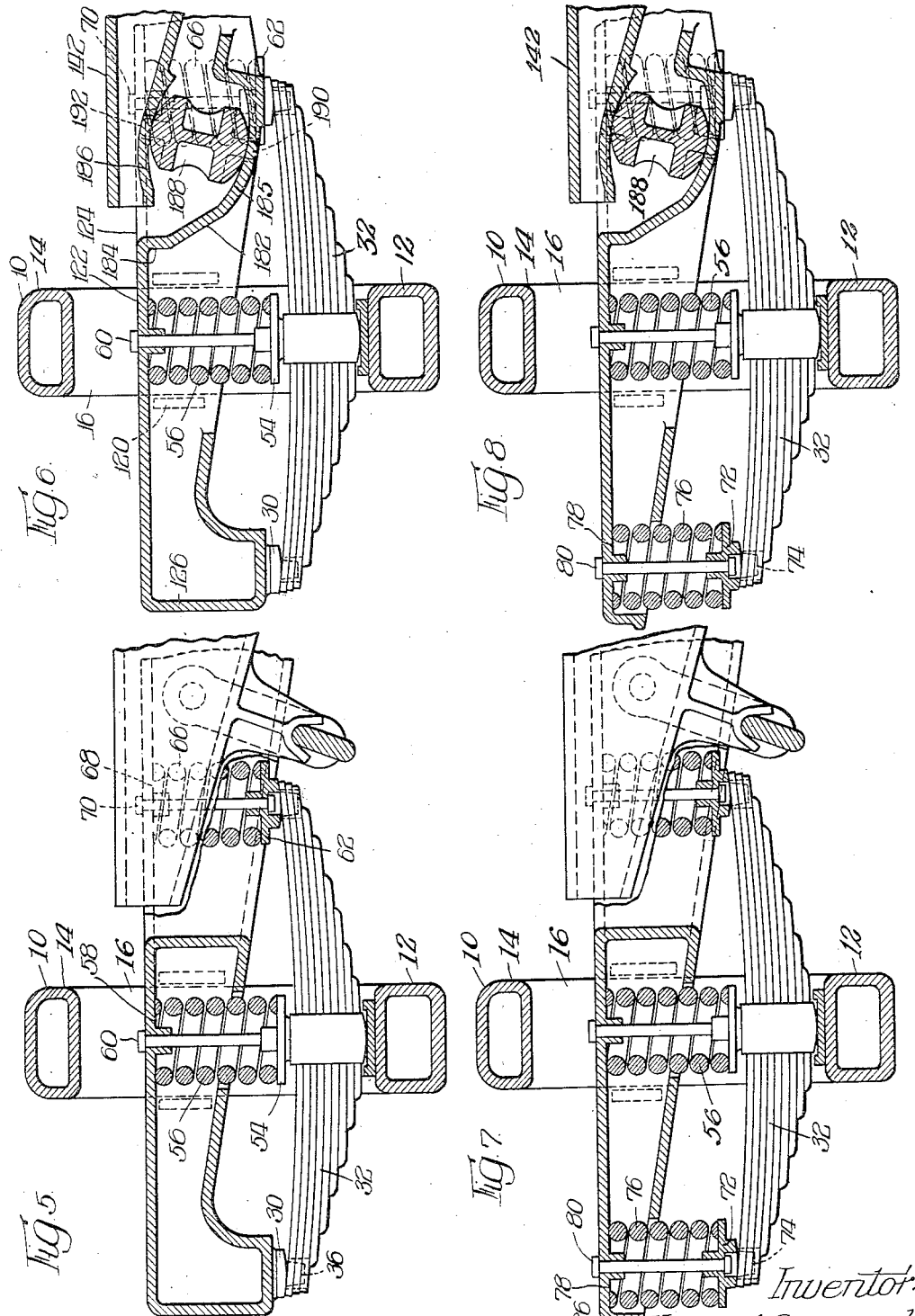
Inventor:
Howard Somervell,
By Wilkinson, Huxley, Byron & Knight
Attys.

Patented June 27, 1933

1,916,079

UNITED STATES PATENT OFFICE

HOWARD SOMERVELL, OF EVANSTON, ILLINOIS, ASSIGNOR TO AMERICAN STEEL FOUNDRIES, OF CHICAGO, ILLINOIS, A CORPORATION OF NEW JERSEY

TRUCK

Application filed August 28, 1931. Serial No. 559,348.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive, leaf springs relatively less so, in response. For this reason, and also by providing coil and leaf springs of different natural vibration periods, they tend to dampen each other's synchronous vibration without impairing free spring response. This condition is obtained by having the different springs in series. Placing leaf and coil springs in parallel is not generally sufficient in an ordinary truck, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

A passenger car truck also contributes to easy riding by having the bolster suspended on inclined swing hangers for lateral motion to soften lateral shocks, but this construction is commonly considered too complicated and costly for freight car trucks.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series without complete duplication of carrying capacity in each kind.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

Yet another object is to provide a car truck having a simple and economical lateral motion bolster construction having an action similar to that with inclined swing hangers.

A yet further object is to provide a truck construction wherein resilient pads are provided for dampening out metallic vibrations transmitted through the metallic truck parts, and also for the purpose of deadening noise.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figures 1 to 8 inclusive are fragmentary transverse sectional elevations through truck constructions embodying the invention.

Referring first of all more particularly to Figures 1, 3, 5, and 7, the truck side frame 10 is of the usual truss construction including the tension member 12, the compression member 14, and the spaced column guides 16, it being understood that the tension and compression members merge adjacent their ends and are provided with journal boxes cooperating with the journal ends of wheel and axle assemblies. The transom 18 extends between the side frames, being provided with the spaced members 20 providing sliding cooperation between the transom and column guides. The transom includes spaced members 24 connected adjacent their ends by means of the transverse members 26, the members 26 extending outwardly beyond the side frames 10.

The transom is provided with the inner and outer spring seat members 28 and 30 provided on the spaced members 24 and on the end connecting members 26. The spring seat members 28 and 30 have seating cooperation with the inner and outer ends of the semi-elliptic leaf spring assemblies 32. Dowels 34 and 36 serve to position the leaf spring assemblies with respect to the transom. The spring band 38 of the leaf spring assembly is rockably seated on the seat member 40 provided on the tension member 12, it being understood that a spring plank may or may not be used. The bolster 42 is positioned between the spaced members 24 of the transom and is provided with the depending seat 44 having cooperation with the connecting member 46 disposed between the links 48, the links being pivoted as at 50 to the spaced members 24 of the transom whereby transverse rocking movement of the bolster is permitted, the extent of this movement being limited by the stops 52 provided between the spaced members 24 of the transom. The spring seat 54 is seated on the spring band 38, being provided with a depending positioning dowel received by the spring, and is provided with the coil spring assembly 56 disposed between the leaf spring and the seat 58 provided on the transom, the bolt 60 serving also as a means to position these members.

In the construction illustrated in Figure 3, the leaf spring 32 is seated at its outer end on the seat member 30 and positioned by means of the dowel 36. The inner end of the leaf spring assembly, however, is provided with the spring seat 62 positioned by means of the dowel 64, the spring seat being provided with the coil spring assembly 66 disposed between the seat 62 and the seat 68 provided on the spaced members 24 of the transom, the bolt 70 also serving to position the assembly.

In the construction shown in Figures 5 and 7, the spring seat 54 is provided in conjunction with the spring seat 62, each supporting their respective spring assemblies 56 and 66 disposed between the seats 58 and 68 positioned by means of dowels and by the bolts 60 and 70. In Figure 5, however, the outer end of the leaf spring assemblies 32 is positioned on the seat member 30 by means of the dowel 36. In Figure 7, the outer end of the leaf spring assembly 32 is provided with the spring seat 72 positioned by means of the dowel 74 on the spring assembly and being provided with the leaf spring assembly 76 disposed between said spring seat and a spring seat 78 provided on the outer end of the transom, the bolt 80 also serving to position the members in operative relation.

In the constructions shown in Figures 2, 4, 6 and 8, the transom 122 is provided with the spaced members 124 connected at their ends as at 126 and provided with the column guide cooperating members 120 cooperating with the columns 16 and the side frame 10. The transom is also provided inwardly of the side frames with a transverse track or seat member 182 provided with a portion 184 serving as a stop for the bolster 142, the track and bolster being provided with arcuate surfaces 185 and 186 between which surfaces the rocker 188 is positioned, said rocker being centered by means of the members 190 and 192 disposed in suitable apertures in said arcuate surfaces.

In the construction shown in Figure 2, the track and end connecting member 126 is provided with the seat members 28 and 30 cooperating with the inner and outer ends of the leaf spring assembly 32, the leaf spring assembly being provided with the spring band 38 rockably supported in the seat 40 supported on the tension member 12. The spring seat 54 is supported on the spring band 38, being positioned by a suitable dowel, and is provided with the coil spring assembly 56 disposed between the spring seat and the spring 58 provided on the transom, the bolt 60 also serving to maintain said members in operative relation.

In the construction shown in Figure 4, the leaf springs are spaced apart substantially the distance of the bolster, and are provided adjacent their inner ends with the spring seat member 62 provided with the positioning dowel 64 and having a coil spring assembly 66 disposed therebetween and between the seat 68 provided on the member 124 of the transom, the bolt 70 also positioning said members in operative position.

In Figures 6 and 8, the spring seat 54 as well as the spring seat 62 is provided, the spring seats having suitable positioning dowels and being provided with the spring assemblies 56 and 66 and the positioning bolts 60 and 70, as has already been described. In addition, in Figure 8 the seat member 30 is replaced by the spring seat 72 provided with the positioning dowel 74 and the coil spring assembly 76 is provided between said spring seat 72 and the spring seat 78 provided in the transom. The bolt 80 serves as a positioning member for said spring assembly.

It will be understood that in each of the above modifications, rubber pads may be used between the movable parts to deaden sound and provide additional resilient means. It will also be understood that the spring assembly 76 may be used in conjunction with either or both of the spring assemblies 56 and 66, or may be used alone.

The coil springs described in the above modifications may be of either constant pitch and constant section, constant pitch and variable section, or of variable stiffness, or may be formed from a tapering bar. It will also be understood that any spring, such as shown in application Serial No. 552,153, filed July 21, 1931, may be used.

With the constructions shown, where the coil springs are provided adjacent the ends of the leaf springs, it will be appreciated that the springs are in series, and will tend to dampen out each other's vibrations. The leaf springs serve as a friction member in resisting movement of the transom. Where the center spring is utilized, a truck construction is provided wherein one spring is used in conjunction with the other, operating in parallel rather than in series, and of course where the center coil spring is utilized together with an end spring a construction is provided wherein the springs of different character are operable in series and parallel.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, and a coil spring disposed between said first named spring and transom substantially in the plane of said side frame.

2. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, and a bolster linked for swinging movement to said transom.

3. In a truck, the combination of a side frame having spaced tension and compression members and connecting spaced column guides forming a transom opening, a transom extending through said opening and slidably cooperating with said guides, a leaf spring supporting said transom at a plurality of points and carried by said tension member between said guides, a coil spring disposed between said first named spring and transom, and a bolster linked for swinging movement to said transom.

4. In a truck, the combination of a side frame having spaced tension and compression members and connecting spaced column guides forming a transom opening, a transom extending through said opening and slidably cooperating with said guides, a leaf spring supporting said transom adjacent the ends of said spring and carried by said tension member adjacent the center of said spring, and a coil spring disposed between said transom and said first named spring adjacent the center thereof.

5. In a truck, the combination of a side frame having spaced tension and compression members and connecting spaced column guides forming a transom opening, a transom extending through said opening and slidably cooperating with said guides, a leaf spring supporting said transom adjacent the ends of said spring and carried by said tension member adjacent the center of said spring, a coil spring disposed between said transom and said first named spring adjacent the center thereof, and a bolster linked for swinging movement to said transom.

6. In a truck, the combination of a side frame having spaced tension and compression members and connecting spaced column guides forming a transom opening, a transom extending through said opening and slidably cooperating with said guides, a leaf spring supporting said transom adjacent the ends of said spring and carried by said tension member adjacent the center of said spring, a coil spring disposed between said transom and said first named spring adjacent the center thereof, and a bolster mounted on said transom for transverse movement of said truck.

7. In a truck, the combination of a side frame having spaced tension and compression members and connecting spaced column guides forming a transom opening, a transom extending through said opening and slidably cooperating with said guides, a leaf spring supporting said transom adjacent the ends of said spring and carried by said tension member adjacent the center of said spring, a coil spring disposed between said transom and said first named spring adjacent the center thereof, and a bolster mounted on rockers carried by said transom for transverse movement of said truck.

8. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, and a coil spring disposed between said first named spring and transom adjacent the inner end of said first named spring.

9. In a truck, the combination of a side frame having spaced tension and compression members and connecting spaced column guides forming a transom opening, a transom extending through said opening and slidably cooperating with said guides, a leaf spring supporting said transom at a plurality of points and carried by said tension member between said guides, and a coil spring disposed between said first named spring and transom adjacent the inner end of said first named spring.

10. In a truck, the combination of a side frame having spaced tension and compression members and connecting spaced column guides forming a transom opening, a transom extending through said opening and slidably cooperating with said guides, a leaf spring supporting said transom adjacent the ends of said spring and carried by said tension member adjacent the center of said spring, and a coil spring disposed between said transom and said first named spring adjacent the inner end of said first named spring.

11. In a truck, the combination of a side frame having spaced tension and compression members and connecting spaced column guides forming a transom opening, a transom extending through said opening and slidably cooperating with said guides, a leaf spring supporting said transom at a plurality of points and carried by said tension member between said guides, a coil spring disposed between said first named spring and transom adjacent the inner end of said first named spring, and a bolster linked for swinging movement to said transom.

12. In a truck, the combination of a side frame having spaced tension and compression members and connecting spaced column guides forming a transom opening, a transom extending through said opening and slidably cooperating with said guides, a leaf spring supporting said transom adjacent the ends of said spring and carried by said tension member adjacent the center of said spring, a coil spring disposed between said transom and said first named spring adjacent the inner end of said first named spring, and a bolster linked for swinging movement to said transom.

13. In a truck, the combination of a side frame having spaced tension and compression members and connecting spaced column guides forming a transom opening, a transom extending through said opening and slidably cooperating with said guides, a leaf spring supporting said transom at a plurality of points and carried by said tension member between said guides, a coil spring disposed between said first named spring and transom adjacent the inner end of said first named spring, and a bolster mounted on said transom for transverse movement of said truck.

14. In a truck, the combination of a side frame having spaced tension and compression members and connecting spaced column guides forming a transom opening, a transom extending through said opening and slidably cooperating with said guides, a leaf spring supporting said transom adjacent the ends of said spring and carried by said tension member adjacent the center of said spring, a coil spring disposed between said transom and said first named spring adjacent the inner end of said first named spring, and a bolster mounted on said transom for transverse movement of said truck.

15. In a truck, the combination of a side frame having spaced tension and compression members and connecting spaced column guides forming a transom opening, a transom extending through said opening and slidably cooperating with said guides, a leaf spring supporting said transom at a plurality of points and carried by said tension member between said guides, a coil spring disposed between said first named spring and transom adjacent the inner end of said first named spring, and a bolster mounted on rockers carried by said transom for transverse movement of said truck.

16. In a truck, the combination of a side frame having spaced tension and compression members and connecting spaced column guides forming a transom opening, a transom extending through said opening and slidably cooperating with said guides, a leaf spring supporting said transom adjacent the ends of said spring and carried by said tension member adjacent the center of said spring, a coil spring disposed between said transom and said first named spring adjacent the inner end of said first named spring, and a bolster mounted on rockers carried by said transom for transverse movement of said truck.

17. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, and another coil spring disposed between one end of said semi-elliptic spring and said transom.

18. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, another coil spring disposed between one end of said semi-elliptic spring and said transom, and a bolster linked for swinging movement to said transom.

19. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, and another coil spring disposed between the inner end of said semi-elliptic spring and said transom.

20. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, another coil spring disposed between the inner end of said semi-elliptic spring and said transom, and a bolster linked for swinging movement to said transom.

21. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, another coil spring disposed between one end of said semi-elliptic spring and said transom, and a bolster mounted on rockers carried by said transom for transverse movement of said truck.

22. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, another coil spring disposed between the inner end of said semi-elliptic spring and said transom, and a bolster mounted on rockers carried by said transom for transverse movement of said truck.

23. In a truck, the combination of a side frame having spaced tension and compression members and connecting spaced column guides forming a transom opening, a transom extending through said opening and slidably cooperating with said guide, a semi-elliptic spring supporting said transom at a plurality of points and carried by said tension member between said guides, a coil spring disposed between said first named spring and transom substantially in the plane of said side frame, and a coil spring mounted between each end of said semi-elliptic spring and said transom.

24. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, a coil spring mounted between each end of said semi-elliptic spring and said transom, and a bolster linked for swinging movement to said transom.

25. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, a coil spring mounted between each end of said semi-elliptic spring and said transom, and a bolster mounted on rockers carried by said transom for transverse movement of said truck.

26. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, and a coil spring disposed between said first named spring and transom substantially in the plane of said side frame, said coil spring being of variable stiffness.

27. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, and a coil spring disposed between said first named spring and transom substantially in the plane of said side frame, said coil spring being of variable pitch.

28. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, and a coil spring disposed between said first named spring and transom substantially in the plane of said side frame, said coil spring being of constant section and pitch.

29. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, said coil spring being of variable stiffness, and resilient pads interposed between one of said springs and said transom.

30. In a truck, the combination of a side frame having spaced tension and compression members and connecting spaced column guides forming a transom opening, a transom extending through said opening and slidably cooperating with said guides, a semi-elliptic spring supporting said transom at a plurality of points and carried by said tension member between said guides, a coil spring disposed between said first named spring and transom substantially in the plane of said side frame, said coil spring being of variable stiffness, and resilient pads interposed between one of said springs and said side frame.

31. In a truck, the combination of a side frame including a beam member, a transom, a bolster carried by said transom, a leaf spring supported on said beam member intermediate the ends of said spring and supporting said transom at a plurality of points, and a metallic spring of different character than said leaf spring interposed between said transom and side frame and substantially in the plane of said side frame.

32. In a truck, the combination of a side frame including a beam member, a transom, a bolster carried by said transom, a leaf spring supported on said beam member intermediate the ends of said spring and supporting said transom at a plurality of points, and a coil spring of different character than said leaf spring interposed between said transom and side frame and substantially in the plane of said side frame.

33. In a truck, the combination of a side frame including a beam member, a transom, a bolster carried by said transom, a leaf spring supported on said beam member intermediate the ends of said spring and supporting the transom at a plurality of points one of said points being through a metallic spring, and a metallic spring interposed between the transom and side frame and substantially in the plane of said side frame.

34. In a truck, the combination of a side frame including a beam member, a transom, a bolster carried by said transom, a leaf spring supported on said beam member intermediate the ends of said spring and supporting the transom at a plurality of points one of said points being through a coil spring, and a coil spring interposed between the transom and side frame and substantially in the plane of said side frame.

35. In a truck, the combination of a side frame including a beam member, a transom, a bolster carried by said transom, a leaf spring supported on said beam member intermediate the ends of said spring and supporting said transom at a plurality of points, and a metallic spring of different character than said leaf spring interposed between said transom and leaf spring and substantially in the plane of said side frame.

36. In a truck, the combination of a side frame including a beam member, a transom, a bolster carried by said transom, a leaf spring supported on said beam member intermediate the ends of said spring and supporting said transom at a plurality of points, and a coil spring of different character than said leaf spring interposed between said transom and leaf spring and substantially in the plane of said side frame.

37. In a truck, the combination of a side frame including a beam member, a transom, a bolster carried by said transom, a leaf spring supported on said beam member intermediate the ends of said spring and supporting said transom at a plurality of points one of said points being through a metallic spring, and a metallic spring interposed between said transom and said leaf spring and substantially in the plane of said side frame.

38. In a truck, the combination of a side frame including a beam member, a transom a bolster carried by said transom, a leaf spring supported on said beam member intermediate the ends of said spring and supporting said transom at a plurality of points one of said points being through a coil spring, and a coil spring interposed between said transom and said leaf spring and substantially in the plane of said side frame.

39. In a truck, the combination of a side frame including a beam member, a transom, a bolster carried by said transom, a leaf spring supported on said beam member intermediate the ends of said spring and supporting said transom at the ends of said spring through metallic springs, and a metallic spring of different character than said leaf spring interposed between said transom and side frame and substantially in the plane of said side frame.

40. In a truck, the combination of a side frame including a beam member, a transom, a bolster carried by said transom, a leaf spring supported on said beam member intermediate the ends of said spring and supporting said transom at the ends of said spring through coil springs, and a coil spring of different character than said leaf spring interposed between said transom and side frame and substantially in the plane of said side frame.

41. In a truck, the combination of a side frame including a beam member, a transom, a bolster carried by said transom, a leaf spring supported on said beam member intermediate the ends of said spring and supporting said transom at the ends of said spring through metallic springs, and a metallic spring interposed between said transom and said leaf spring and substantially in the plane of said side frame.

42. In a truck, the combination of a side frame including a beam member, a transom, a bolster carried by said transom, a leaf spring supported on said beam member intermediate the ends of said spring and supporting said transom at the ends of said spring through coil springs, and a coil spring interposed between said transom and said leaf spring and substantially in the plane of said side frame.

43. In a truck, the combination of a side frame including a beam member, a transom, a bolster carried by said transom, a leaf spring supported on said beam member intermediate the ends of said spring and supporting said transom at a plurality of points through coil springs engaging said transom.

44. In a truck, the combination of a side frame including a beam member, a transom, a bolster carried by said transom, a leaf spring supported on said beam member intermediate the ends of said spring and supporting said transom at a plurality of points one of said points being outwardly of the beam member and the other of said points being inwardly of the beam member and a coil spring interposed between the transom and leaf spring at the inner of said points.

45. In a truck, the combination of a side frame including a beam member, a transom, a bolster carried by said transom, a leaf spring supported on said beam member intermediate the ends of said spring and supporting said transom at a plurality of points one of said points being outwardly of the beam member and the other of said points being inwardly of the beam member and a coil spring interposed between the transom and leaf spring at the inner of said points and a coil spring interposed between said transom and side frame and substantially in the plane of said side frame.

46. In a truck, the combination of a side frame including a beam member, a transom, a bolster carried by said transom, a leaf spring supported on said beam member intermediate the ends of said spring and supporting said transom at a plurality of points one of said points being outwardly of the beam member and the other of said points being inwardly of the beam member and a coil spring interposed between the transom and leaf spring at the inner of said points and a coil spring interposed between said transom and leaf spring and substantially in the plane of said side frame.

47. In a truck, the combination of a side frame including a beam member, a transom, a bolster carried by said transom, a leaf spring supported on said beam member intermediate the ends of said spring and supporting said transom at a plurality of points, one of said points being disposed inwardly of said beam member and the other of said points being disposed outwardly of the beam member, a coil spring interposed between the transom and leaf spring at the point disposed outwardly of the beam member, and a coil spring interposed between said transom and side frame and substantially in the plane of said side frame.

48. In a truck, the combination of a side frame including a beam member, a transom, a bolster carried by said transom, a leaf spring supported on said beam member intermediate the ends of said spring and supporting said transom at a plurality of points, one of said points being disposed inwardly of said beam member and the other of said points being disposed outwardly of the beam member, a coil spring interposed between the transom and leaf spring at the point disposed outwardly of the beam member, and a coil spring interposed between said transom and leaf spring and substantially in the plane of said side frame.

Signed at Chicago, Illinois, this 11th day of August, 1931.

HOWARD SOMERVELL.